Mar. 13, 1923.
O. WAGGONER.
BEEHIVE OPENER.
FILED MAY 4, 1922.
1,448,609.
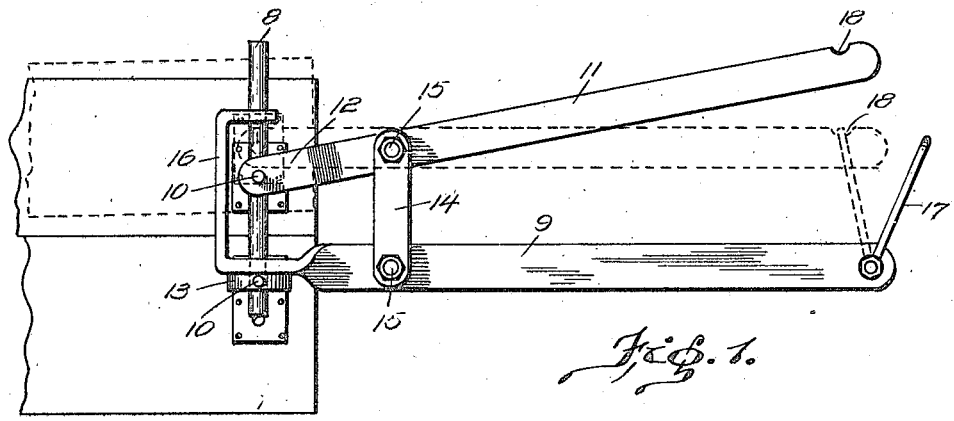
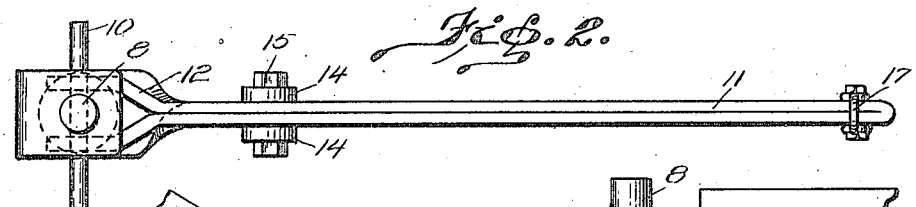
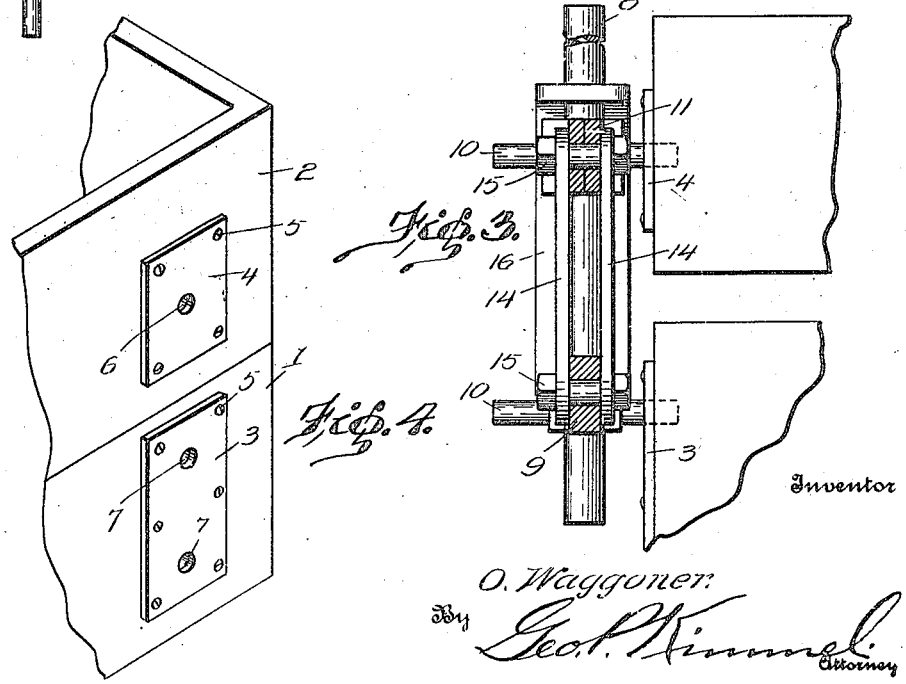
Inventor
O. Waggoner.
By Geo. P. Kimmel
Attorney Patented Mar. 13, 1923.

1,448,609

UNITED STATES PATENT OFFICE.

ORON WAGGONER, OF ALTON, ILLINOIS.

BEEHIVE OPENER.

Application filed May 4, 1922. Serial No. 558,375.

*To all whom it may concern:*

Be it known that I, ORON WAGGONER, a citizen of the United States, residing at Alton, in the county of Madison and State of Illinois, have invented certain new and useful Improvements in Beehive Openers, of which the following is a specification.

This invention has reference to bee hive openers where the bee hive is provided with supers in which the honeycomb and honey is stored by the bees and which supers when filled with honey are sold intact to the customer.

The small boxes in which the honey is stored by the bees are relatively delicate and easily damaged, which latter occurrence is liable to happen when the attempt is made to loosen up the honey containing boxes or supers, because in the storage of honey, the supers become glued to the supporting structures and the usual practice of loosening the supers from the supporting structures by the use of a knife or other implement of like character not only results in damage to the supers, but is liable to disturb the bees in the hive.

It is the object of the present invention to avoid damage to the supers and disturbance of the bees and provision is made by this invention to not only loosen the supers where glued to the under-structures by the natural adhesive deposited by the bees, but the supers are loosened and removed from the bee hive without producing such disturbance within the bee hive as to annoy the bees.

In accordance with the invention, there is provided a tool introducable between the supers and the under-structure on which such supers rest, which tool is readily manipulated by the keeper of the hive in a manner to lift the super and separate it, where attached to the under-structure, from the latter, without harm to the super or without such agitation as to disturb the bees in the hive.

The invention will be best understood by a consideration of the following detailed description taken in connection with the accompanying drawings forming part of this specification, with the understanding that the invention is not confined to any strict conformity to the showing of the drawings, but may be changed and modified so long as such changes and modifications mark no material departure from the salient features of the invention as expressed in the accompanying claim.

In the drawings:—

Figure 1 is a side elevation of the super separating tool, showing its mode of operation, Fig. 2 is a plan view of the tool, Fig. 3 is a view partly in section and partly in elevation, showing the operation of the tool, and, Fig. 4 is a perspective view of one corner of the hive structure and super boxes thereon.

Referring to the drawings, there is shown a small section 1 of a bee hive and a super honey-containing box 2 in which the honey is stored by the bees. It is to be understood that the hive may contain numerous boxes 2, although but one such box is shown. Moreover several superposed boxes may be employed for containing the honey stored by the bees.

The super boxes 2 are relatively frail structures easily damaged by the employment of a knife or other like implement to separate the boxes from the under-structures, whether such under-structures be other like boxes or not.

The boxes 1 and 2, whether or not they be in greater relative number than indicated in Fig. 4, have a plate 3 and a plate 4, fast to the outer faces thereof by screws or bolts 5 and each plate may have a central perforation 6 or a plurality of superposed perforations 7, for the application of a separating and lifting tool capable of ready manipulation by the hive keeper.

As shown in the drawings, the manipulating tool comprises an elongated rod 8 to which is secured one end of a lever 9 by means of a pin 10 traversing the rod 8. The pin 10 is shown in certain of the Figures of the drawing as sufficiently elongated transversely to the length of the rod 8, to enter a socket 6 or 7 in the respective plates 3 and 4, and furthermore, the pins 10 may be long enough to extend from one box 2 to an opposite, companion box, as indicated in Fig. 3.

Associated with the lever 9 is another similar lever 11, both levers being formed of strap metal or other suitable material, each with one end 12 spread open to straddle the rod 8 and to engage the respective pin 10.

Near one end of the rod 8 there is located a washer or plate 13, traversed by the pin 10 traversing the rod 8 near the corresponding end of the lever 9, while the lever 11 is traversed by the other pin 10 in turn traversing the rod 8 in spaced relation to the first named pin 10.

The two levers 9 and 11 are connected together at a short distance from the pin 10 by links 14 connected to the levers 9 and 11 by bolts or pins 15.

Constituting a continuation of the lever 9 beyond the rod 8 is a yoke 16, at the end remote from the lever 9 encircling the rod 8, so that those ends of the levers 9 and 11 remote from the rod 8 may be made to approach or recede and the lever 11 pivoting on the links 14 will cause the pins 10 to correspondingly approach or recede.

When the levers 9 and 11 have been brought toward each other as far as they travel, they may be fastened in such position by a pivoted link 17 carried by the free end of the lever 9 and engaging over the free end of the lever 11 and into a notch 18 at said free end of the lever 11.

In order to remove the supers from the main body of the hive despite any gluing action of the bee secretion which may occur, the tool of the invention is applied, pins 10 engaging in the plates 3 and 4 will separate these plates and with them the supers to the extent determined by the levers 9 and 11 and this occurs without damage to the delicate super-structures and with so little disturbance to the hive as to not disturb the bees at all.

The tool employed may be locked in the operative position and the honey containing super box may be transported to any desired position without disturbance of the bees within the hive.

What is claimed is:—

A hive opener comprising a guide and supporting rod therefor, a lever mounted near one end of the rod and pinned thereto, another lever pinned to the rod in spaced relation to the first lever, a link connection between the levers near the pinned end, and a yoke fast to the pinned end of one lever and encircling and slidable along the rod on the side of the second lever remote from the first lever, whereby the supers of the hive boxes may be engaged and lifted therefrom by the opener without harm to the supers.

In testimony whereof, I affix my signature hereto.

ORON WAGGONER.